May 28, 1957 A. W. TORGESON 2,793,820
WIRE WINDING APPARATUS
Filed Dec. 19, 1955

INVENTOR.
ARTHUR W. TORGESON
BY
Caswell & Lagaard
ATTORNEYS

United States Patent Office 2,793,820
Patented May 28, 1957

2,793,820
WIRE WINDING APPARATUS
Arthur W. Torgeson, Slayton, Minn.
Application December 19, 1955, Serial No. 553,807
7 Claims. (Cl. 242—86.5)

The herein disclosed invention relates to wire winding apparatus and particularly to apparatus for winding up considerable lengths of strung-out telephone or power line wire which is disposed upon the ground.

An object of the invention resides in providing apparatus in which a reel is used and on which the wire is wound and which is disposed in close proximity to the ground.

A still further object of the invention resides in providing an apparatus in which the reel is disposed with its axis vertical and in which the reel is driven from the driven shaft of a tractor.

Another object of the invention resides in providing an apparatus particularly adapted to be used with a tractor having a vertical driven shaft.

An object of the invention resides in providing the apparatus with a base adapted to rest on the ground and having a prong issuing downwardly therefrom and adapted to enter the ground to prevent lateral movement of the base, and further having a vertically extending spindle attached thereto and extending upwardly therefrom and coaxial with respect to said driven shaft.

Another object of the invention resides in providing an anti-friction bearing having a race attached to said base and a rotating race, both concentric with the axis of said spindle.

A still further object of the invention resides in providing a rotating platform carried by the rotating race and on which a reel centered by said spindle rests.

A feature of the invention resides in making said prong coaxial with respect to said spindle.

Another object of the invention resides in providing driving means acting directly between the driven shaft and reel.

A still further object of the invention resides in constructing said driving means with an arm secured to said driven shaft and having a pin projecting downwardly therefrom and entering a hole in said reel eccentric with reference to the axis thereof.

Other objects of the invention reside in the novel combination and arrangement of parts and in the details of construction hereinafter illustrated and/or described.

Figures 1, 2:
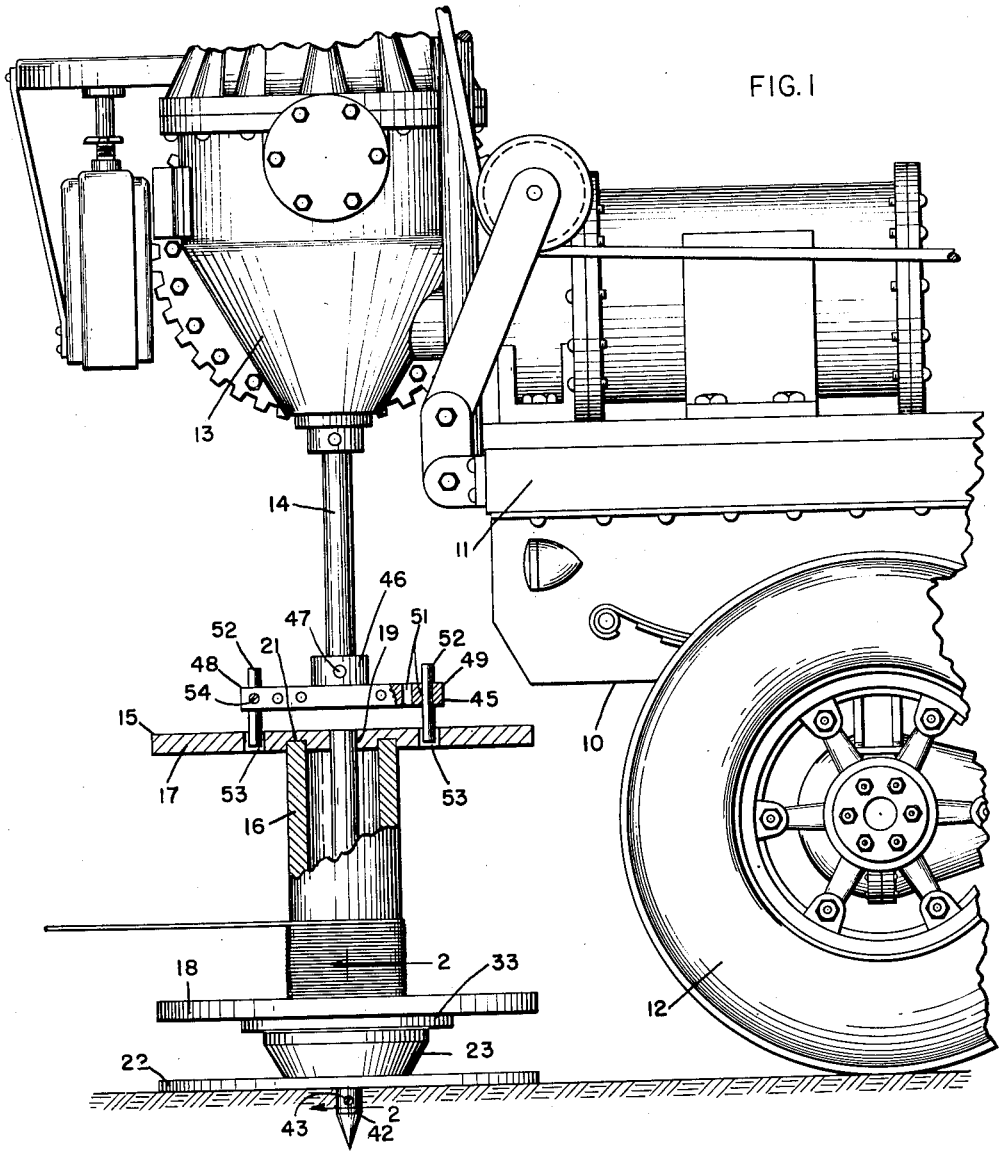
Fig. 1 is an elevational view, partially in section, of the rearward portion of a tractor equipped with a vertical driven shaft and illustrating an embodiment of the invention applied thereto.
Fig. 2 is a sectional view taken on line 2—2 of Fig. 1 and drawn to a greater scale.

For the purpose of illustrating the invention, a portion of a tractor in the form of a truck has been shown and indicated by the reference numeral 10 in Fig. 1. This tractor consists of a chassis 11 supported on supporting wheels 12 in the customary manner. Only the rear portion of the truck has been shown though it can be readily comprehended that the truck is provided with an engine and control equipment as is customary with trucks or tractors. Mounted on the rearward portion of the chassis 11 is a power transmission 13 which is driven from the engine of the truck by means of a suitable drive not illustrated in the drawings. This transmission includes a vertical driven shaft 14 which is disposed rearwardly of the chassis and which may be raised and lowered as required. The construction shown is primarily used for digging post holes and is well known in the art for the purpose.

The invention utilizes a reel 15 which consists of a drum 16 attached to flanges 17 and 18. The reel may be constructed of wood, metal, or other suitable material, and the construction thereof forming no particular feature of the invention has not been shown in detail. The flanges 17 and 18 have holes 10 in the centers of the same and which are coaxial with the drum 16. In the form of the reel illustrated, the drum 16 is recessed in annular grooves 21 formed in the flanges 17 and 18.

The invention proper consists of a base 22 which may be a metal plate and which has secured to it a bearing 23 whose axis is vertical. The base 22 is adapted to rest on the ground where the reel is to be operated. The bearing 23 consists of a cup-shaped lower race 24 which has a central portion 25 which overlies said base and is secured thereto by means of cap screws 26. This race is formed with an upwardly facing internal inverted conical race surface 27. Received within the race 24 is an upper race 28 which is formed with an upper planiform surface 32 normal to the axis of said race and with an outer inverted conical race surface 29. The surface 29 has a slightly lesser taper than the surface 27. Mounted for rotation between the surfaces 27 and 29 are a number of conical rollers 31 which support the race 28 for rotational movement with respect to the race 24 and the base 22. Mounted on the upper surface 32 of the race 28 is a supporting platform 33. This platform is secured to the race by means of cap screws 34 which extend through said race and are screwed into said platform.

Extending upwardly from the base 22 and secured thereto is a spindle 35. This spindle has a reduced portion 36 forming a shoulder 37 with the spindle proper. The reduced portion 36 passes centrally through the platform 33 and the race 28 and is formed at its lower end with a second reduced portion 38 forming another shoulder 39 with the portion 36. The shoulder 39 engages the central portion 25 of the race 24 and the reduced portion 38 extends through said portion of the race and through the base 22. The reduced portion 38 of the spindle is formed with threads 41 and extends below said base. Screwed on the threads 41 is a prong 42 which is adapted to enter into the earth when the plate is placed thereon and which prevents lateral movement of the entire mechanism when the same is placed in operation. A set screw 43 screwed into said prong prevents disengagement of the same from the spindle. By means of this construction, the spindle is securely clamped to the base 22 and race 24. Shoulder 37 is engageable with the upper surface 44 of the platform 33 and prevents disengagement of the parts of the bearing 23 from one another.

For driving the reel 15, the shaft 14 of the tractor 10 is employed which is provided with a head 45 secured thereto. This head includes a hub 46 which is bored to receive the lower end of said shaft and which is secured to the shaft by means of a pin 47 extending through said hub and shaft. The head 45 includes two arms 48 and 49 which extend outwardly from the hub 46 in different directions. While two such arms have been shown in the drawings it may readily be comprehended that three or more may be employed and equally spaced circumferentially. The arms 48 and 49 have vertically extending holes 51 in the same and into which drive pins 52 may be inserted. These pins are adapted to project below the head 45 and to be received in registering holes 53 in the upper flange 17 of the reel. These holes are sufficiently large so that the pins 52 are received loosely therein. Set screws 54 screwed into said arms and engaging the pins hold the pins adjustably supported in any of the holes. The pins 52 and the portions of the flange 17 at the holes 53 form shoulders which engage each other and result in a drive between the head 45 and the reel. The holes 53 may be made large enough to take care of any irregularity in the positioning of the reel or misalignment between the axis of the shaft 14 and the axis of the reel.

The manner of using the invention is as follows: The truck is moved to any convenient location where the reel can be placed beneath the shaft 14. The entire mechanism is first placed beneath the shaft 14 with the axis of the spindle coinciding with the axis of shaft 14 and with the base 22 resting on the ground and prong 42 imbedded in the ground. The pins 52 are next applied to the proper holes 51 in the head 45 which correspond with the holes 53 in the flange 17 of the reel. The reel is then applied to the spindle 35 and caused to rest on the platform 33. The shaft 14 is next lowered until the pins 52 enter the holes 53 in the flange 17 of reel 15. The end of the wire is then attached to the reel and the transmission 13 operated to procure rotation of the shaft 14. As the shaft rotates the reel is driven through the pins 52 and the wire wound on the drum 16. It will be readily comprehended that the weight of the reel and wire is taken up by the bearing 23 while the spindle 35 guides the reel for rotation. Any misalignment of the shaft 14 and the axis of the reel will be taken up by the holes 53 being of great enough dimensions so that the pins 52 may operate freely therein.

The advantages of the invention are manifest. The apparatus is quickly and easily installed and requires but a snigle person to operate. The apparatus makes use of existing mechanism on the truck or tractor whereby power can be readily applied to the reel to rotate the same. The reel is located close to the ground so that the wire can be directly wound upon the same while lying on the ground. No alteration or reconstruction of the tractor or the transmission thereof or of the reels is required. The apparatus can be constructed at a nominal expense and will not readily get out of order.

Changes in the specific form of the invention, as herein described, may be made within the scope of what is claimed without departing from the spirit of the invention.

Having described the invention, what is claimed as new and desired to be protected by Letters Patent is:

1. In combination with a tractor having a vertical driven shaft, a base adapted to rest on the ground, a prong projecting downwardly from said base and engageable with the ground to restrain movement of said base along the ground, a bearing race secured to said base and coaxial with respect to said driven shaft, a spindle extending upwardly from said base and secured thereto, said spindle being coaxial with said bearing race and driven shaft, a second bearing race superimposing said first bearing race and coaxial with respect to said spindle, antifriction bearing members between said races, a platform attached to said second race, a reel mounted on said spindle and resting on said platform, and driving means on said driven shaft engageable with said reel to rotate the same.

2. In combination with a tractor having a vertical driven shaft, a base adapted to rest on the ground, a spindle extending upwardly from and secured to said base, said spindle being coaxial with respect to said driven shaft, a prong on said base extending downwardly therefrom and coaxial with said spindle, an antifriction bearing having a race fixed relative to said base and another race rotatable relative thereto, said bearing being coaxial with respect to said spindle, a platform carried by said second race, a reel mounted on said spindle and resting on said platform, and driving means between said driven shaft and reel.

3. In combination with a tractor having a vertical driven shaft, a base adapted to rest on the ground, a spindle extending upwardly from and secured to said base, said spindle being coaxial with respect to said driven shaft, a prong on said base extending downwardly therefrom, an antifriction bearing having a race fixed relative to said base and another race rotatable relative thereto, said bearing being coaxial with respect to said spindle, a platform carried by said second race, a reel mounted on said spindle and resting on said platform, and driving means between said driven shaft and reel.

4. In combination with a tractor having a vertical driven shaft, a base adapted to rest on the ground, a spindle extending upwardly from and secured to said base, said spindle being coaxial with respect to said driven shaft, a prong on said base extending downwardly therefrom and coaxial with said spindle, an antifriction bearing having a race fixed relative to said base and another race rotatable relative thereto, said bearing being coaxial with respect to said spindle, a platform carried by said second race, a reel mounted on said spindle and resting on said platform, an arm on said driven shaft, a vertically extending pin carried by said arm and parallel to the axis of said driven shaft, said reel having a hole therein for the reception of said pin to produce a drive between said driven shaft and reel.

5. In combination with a tractor having a vertical driven shaft, a base adapted to rest on the ground, a spindle extending upwardly from and secured to said base, said spindle being coaxial with respect to said driven shaft, a prong on said base extending downwardly therefrom and coaxial with said spindle, an antifriction bearing having a race fixed relative to said base and another race rotatable relative thereto, said bearing being coaxial with respect to said spindle, a platform carried by said second race, a reel mounted on said spindle and resting on said platform, a driving head secured to said driven shaft and having radial arms extending therefrom, vertically extending shoulders on said arms, and shoulders on said reel engaging the shoulders on said arms to form a drive between said driven shaft and reel.

6. In combination with a tractor having a vertical driven shaft, a base adapted to rest on the ground, a prong projecting downwardly from said base and engageable with the ground to restrain movement of said base along the ground, a bearing race secured to said base and coaxial with respect to said driven shaft, said race having an inverted socket formed with an inner conical surface therein, a spindle secured to said base and extending upwardly through said race and coaxial therewith, a second bearing race having a conical outer surface and received in said socket, antifriction bearing members disposed between said races and contacting said surfaces, a platform secured to said second race, a reel mounted on said spindle and resting on said platform, and driving means on said driven shaft engageable with said reel to rotate the same.

7. In combination with a tractor having a vertical driven shaft, a base adapted to rest on the ground, a prong projecting downwardly from said base and engageable with the ground to restrain movement of said base along the ground, a bearing race secured to said base and coaxial with respect to said driven shaft, said race having an inverted socket formed with an inner conical surface therein, a spindle secured to said base and extending upwardly through said race and coaxial therewith, a second bearing race having a conical outer surface and received in said socket, an antifriction bearing member disposed between said races and contacting said surfaces, a platform secured to said second race, said spindle having an annular shoulder engaging said platform and restraining disengagement of said bearing members from said races, a reel mounted on said spindle and resting on said platform, and driving means on said driven shaft engageable with said reel to rotate the same.

References Cited in the file of this patent

UNITED STATES PATENTS

| | | |
|---|---|---|
| 1,976,314 | White | Oct. 9, 1934 |
| 2,692,092 | Kinsinger | Oct. 19, 1954 |
| 2,726,050 | Jones | Dec. 6, 1955 |